United States Patent
Oliver et al.

(10) Patent No.: US 6,616,124 B2
(45) Date of Patent: Sep. 9, 2003

(54) SPOOL VALVE FOR CONTROLLED DAMPERS

(75) Inventors: Michael L. Oliver, Xenia, OH (US); Troy A. Miller, York, PA (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/085,857

(22) Filed: Feb. 27, 2002

(65) Prior Publication Data

US 2002/0125454 A1 Sep. 12, 2002

Related U.S. Application Data

(60) Provisional application No. 60/273,938, filed on Mar. 7, 2001.

(51) Int. Cl.[7] .................................................. F16K 3/24
(52) U.S. Cl. ........................................ 251/325; 251/321
(58) Field of Search .................................. 251/318–334

(56) References Cited

U.S. PATENT DOCUMENTS

| | | | | | |
|---|---|---|---|---|---|
| 5,078,179 A | * | 1/1992 | Amrhein | ...................... | 251/324 |
| 5,139,227 A | * | 8/1992 | Sumida et al. | .............. | 251/333 |
| 5,950,989 A | * | 9/1999 | Hajek, Jr. | .................... | 251/333 |
| 6,079,694 A | * | 6/2000 | Yoshida | ....................... | 251/324 |

* cited by examiner

*Primary Examiner*—Paul J. Hirsch
(74) *Attorney, Agent, or Firm*—Scott A. McBain

(57) ABSTRACT

The problem of flow induced instability in a control valve for a vehicle damper is solved by a generally tubular shaped valve spool having an open, bridged, flow-through end, rather than side flow openings. The flow-through end of the spool has a narrow flat edge oriented perpendicularly to the axis of the spool, with an inside surface of the spool forming a 55 to 90 degree angle with the flat edge, and meeting the flat edge in a sharp corner.

20 Claims, 4 Drawing Sheets

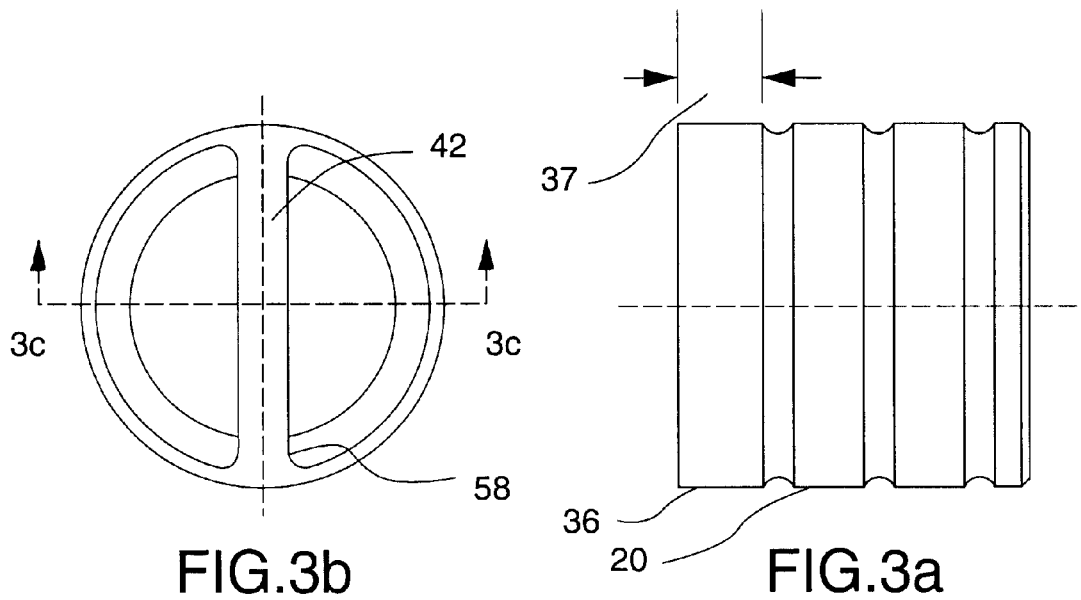
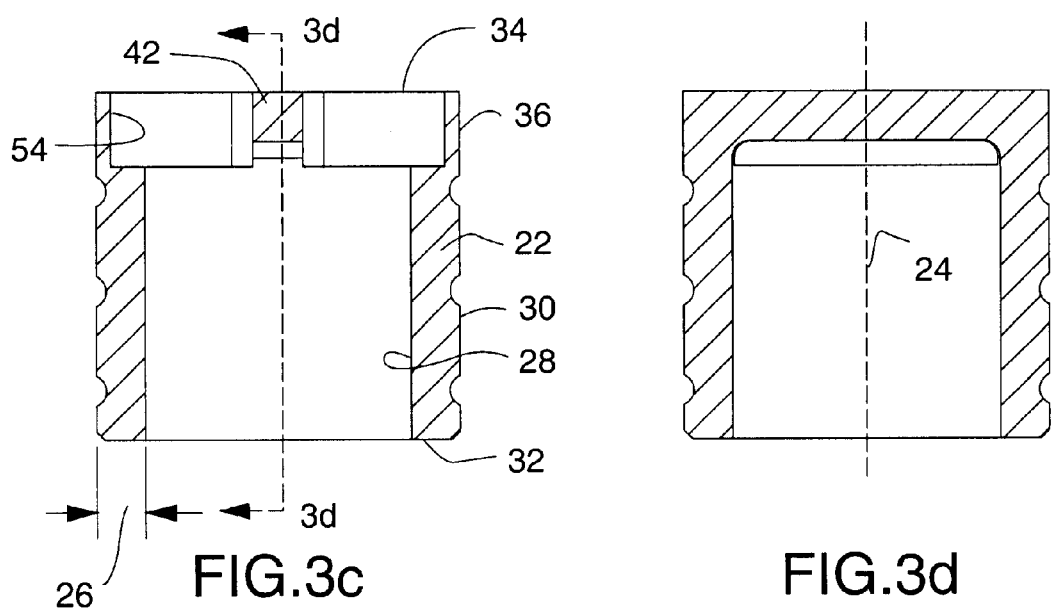

SPOOL VALVE FOR CONTROLLED DAMPERS

PRIOR RELATED APPLICATIONS

This application claims the benefit of U.S. Provisional Patent Application Ser. No. 60/273,938, entitled "Improved Spool Valve for Controlled Dampers," filed Mar. 7, 2001, the entire disclosure of which is incorporated herein by reference.

TECHNICAL FIELD OF THE INVENTION

This invention relates to vehicle suspensions, and more particularly to control valves used in controlled damper vehicle suspension systems.

BACKGROUND OF THE INVENTION

Vehicle suspension systems utilize dampers, such as MacPherson struts or shock absorbers, to improve stability and handling of the vehicle by damping the speed at which the vehicle wheels can move vertically with relation to the vehicle body as the wheels encounter road obstacles, or the body sways in response to steering or other maneuvers incident with driving the vehicle. To optimize performance of the vehicle during both normal slow speed maneuvering of the vehicle, and during high speed maneuvering, some vehicle suspension systems actively control performance of the dampers with a control system having control valves that modulate a flow of hydraulic fluid to the dampers. By increasing or decreasing the pressure and/or rate of fluid flow through the control valve to and from the dampers, the control system can modify the stiffness of the dampers to optimize damper performance as a function of vehicle operation.

A typical valve of the type used for controlling dampers includes generally cup-shaped valve spool 100 having an annular cylindrical wall 102 extending from a closed end 104 along a spool axis 106, as depicted in FIGS. 1a–1c. The annular wall 102 includes side flow openings, in the form of slots 103. The outer surface of the annular wall on either side of the slots 103 defines land areas 108, 110 having a diameter that produce a close tolerance sliding fit of the spool 100 within a bore (not shown) of the valve.

The bore and spool 100 are configured such that the spool 100 can be moved linearly in the bore along the spool axis 106. The sidewall of the bore includes radially directed fluid ports that allow fluid to pass in to or out of the bore. When the spool 100 is positioned in the bore with one of the lands 108, 110 blocking the fluid ports in the sidewall of the bore, fluid cannot flow in or out of the ports. When the spool 100 is positioned in the bore with the slots 103 at least partially overlapping the ports in the sidewall of the bore, fluid can flow through the fluid path formed by the slots 103 and the portion of the ports overlapping the slots 103. Full flow is achieved when the fluid ports are totally uncovered by the slots 103.

The spool 100 is positioned linearly by an actuator mechanism (not shown). The valve may include a spring acting against the open end 112 of the spool and having a pre-load for moving the spool linearly to the left, as depicted in FIGS. 1a–1c, in the bore to move one or both of the lands 108, 110 over the ports in the bore sidewall to block flow through the valve. The actuator may include a movable element bearing against the closed end 104 of the spool 100 for pushing the spool 100 linearly in the bore against the force of the spring, to align the slots 103 and lands 108, 110 partially or fully over the fluid ports in the sidewall of the bore, to thereby regulate fluid flow through the valve. The closed end 104 of the spool may include equalizing orifices 114 to provide a path for fluid in the bore to pass through the closed end 104 of the spool 100, so that the spool 100 can move freely in the bore.

While valves having a spool 100 configured as described above may work well in many applications, this type of valve has exhibited a degree of flow-induced instability that is unacceptable for use in controlling vehicle dampers.

What is needed, therefore, is an improved valve for regulating fluid flow in a controlled damper vehicle suspension, that provides a solution to one or more of the problems described above.

SUMMARY OF THE INVENTION

Our invention provides improved resistance to flow induced instability in a control valve for a vehicle damper, through the use of a generally tubular shaped valve spool having an open, bridged, flow-through end, rather than side flow openings. The flow-through end of the spool has a narrow flat edge oriented perpendicularly to the axis of the spool, with an inside surface of the spool forming a 55 to 90 degree angle with the flat edge, and meeting the flat edge in a sharp corner. In addition to the improved performance achieved in a valve according to our invention, elimination of the side flow openings and closed end of prior spool configurations allows the valve spool in our valve to be shorter than the spools used in prior control valves for vehicle dampers, thereby allowing a control valve according to our invention to be smaller in size and lighter in weight than prior control valves.

In one form of our invention, a valve spool, adapted for linear movement in a bore and for regulating fluid flow through fluid ports entering the bore through a sidewall of the bore, includes a generally tubular cylindrical body having an annular wall defining an axis of the spool, a wall thickness of the spool, and inner and outer cylindrical surfaces of the spool extending between a first and a second axial end of the spool. The outer cylindrical surface of the spool defines a cylindrical land at the second axial end of the spool adapted to slidingly mate with the sidewall of the bore, and having an axial land length sufficient to block flow through the fluid ports of the bore when the spool is positioned within the bore with the land covering the fluid ports. The first end of the spool is adapted for receipt of spring means for urging the spool to move in a first linear direction within the bore, to position the land to block the fluid ports. The second end of the spool is generally open for the passage of fluid, and includes a bar extending laterally across the second end of the spool. The bar is adapted to receive a pin from an actuator extending through the bore, for moving the spool linearly in the bore in a second direction, to compress the spring means and move the second end of the spool to a position within the bore where the ports are at least partially open beyond the second end of the spool. The spool wall and bar at the second end of the spool define substantially sharp corners. The resulting spool configuration reduces linear movement of the spool in the bore when fluid is flowing through the spool, thereby resulting in significantly enhanced stability of the valve.

Our invention may also take the form of a control valve including a valve spool of the form described above. The control valve may also include spring means and actuator means for controlling the position of the spool in the bore.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIGS. 3a–d depict various external views and cross sections of a first exemplary embodiment of a valve spool, according to our invention, as depicted in FIG. 2.

DETAILED DESCRIPTION OF THE PRESENTLY PREFERRED EMBODIMENTS

Figure 1B:
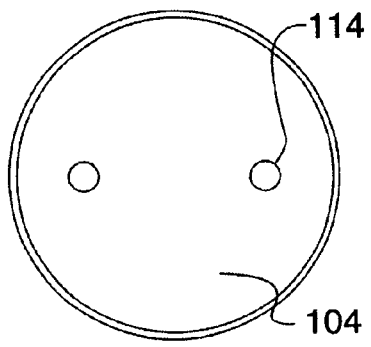
FIGS. 1a–c depict a prior valve spool having side openings and a closed end.
Figure 1A:
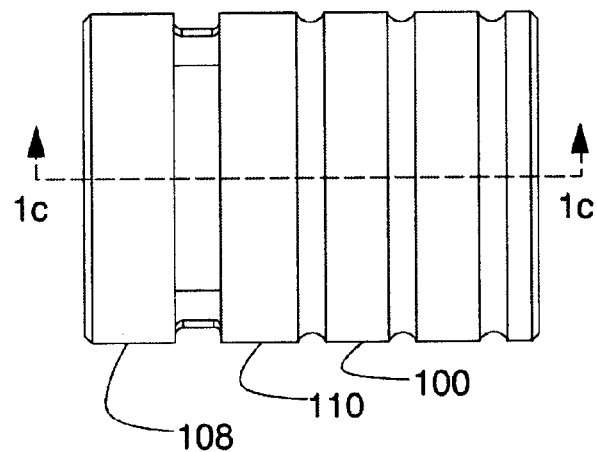
Figure 1C:
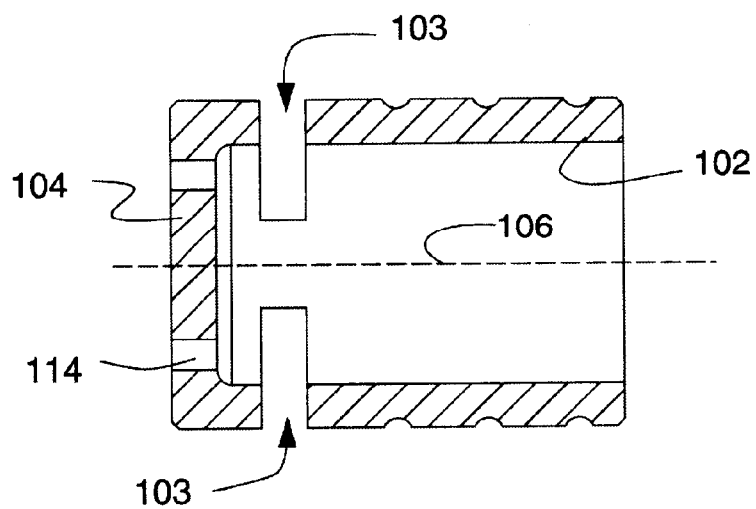
Figure 2:
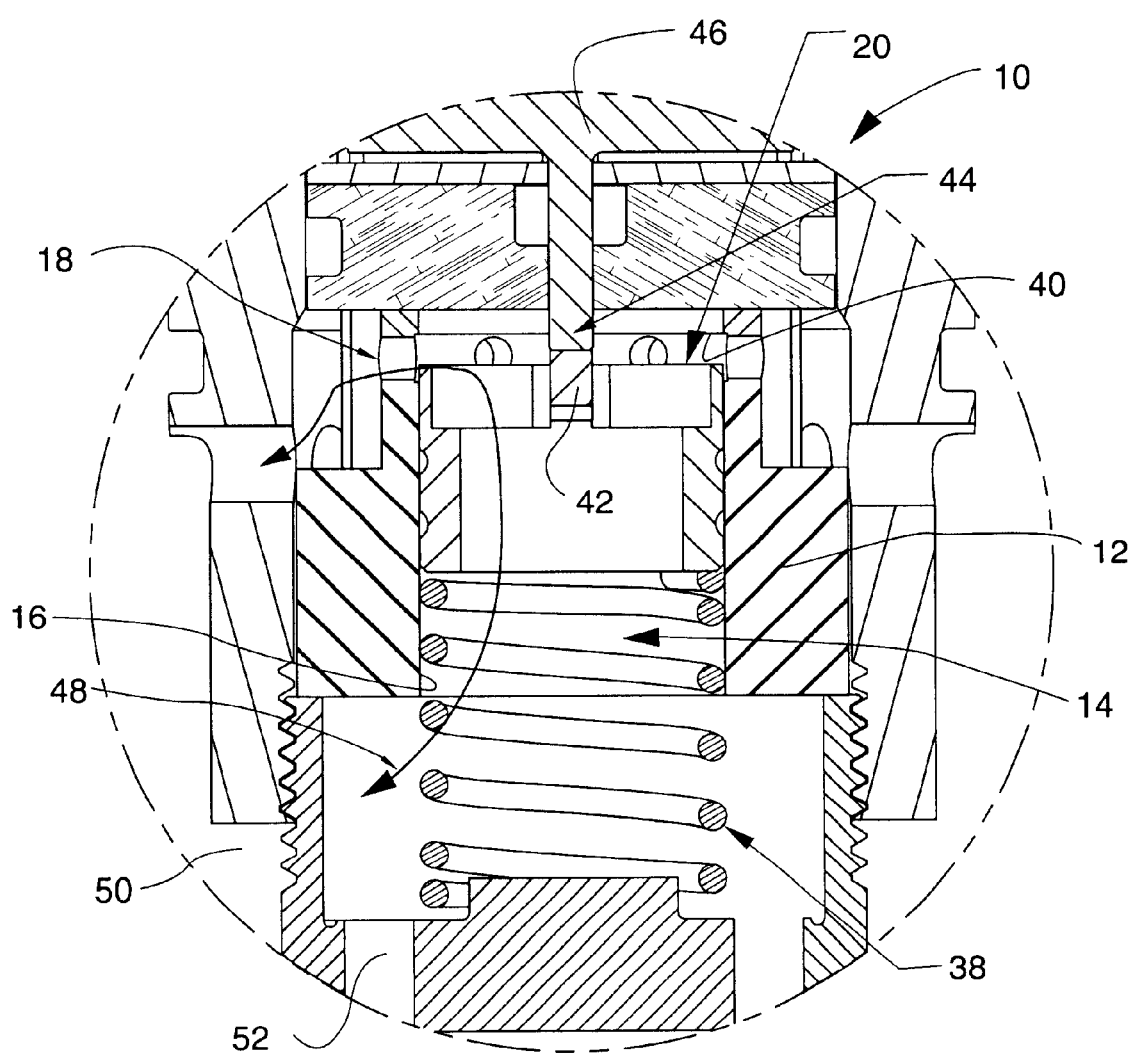
FIG. 2 is partial cross section of a damper control valve, in accordance with our invention.

FIG. 2 depicts a control valve 10 including a housing 12 defining a bore 14 having a sidewall 16 and fluid ports 18 extending through a sidewall 16 of the bore 14. As shown in FIG. 2, and FIGS. 3a–3d, a valve spool 20 is adapted and mounted for linear movement in the bore 14, for regulating fluid flow through the fluid ports 18.

The valve spool 20 has a generally tubular cylindrical body with an annular wall 22 defining an axis 24 of the spool 20, a wall thickness 26 of the spool 20, and inner and outer cylindrical surfaces 28, 30 of the spool 20 extending between a first and a second axial end 32, 34, respectively, of the spool 20. The outer cylindrical surface 30 of the spool 20 defines a cylindrical land 36 adjacent the second axial end 34 of the spool 20. The land 36 is adapted to slidingly mate with the sidewall 16 of the bore 14. The land 36 has an axial land length 37 sufficient to block flow through the fluid ports 18 of the bore 14 when the spool 20 is positioned within the bore 14 with the land 36 covering the fluid ports 18.

The first end 32 of the spool 20 is adapted for receipt of a compression spring 38 operatively mounted in the bore 14 for urging the spool 20 to move in a first linear direction (upward as depicted in FIG. 2) within the bore 14 to position the land 36 to block the fluid ports 18 when the second end 34 of the spool 20 is bearing against a stop 40 at the end of the bore 14. The second end 34 of the spool is generally open for the passage of fluid. A bar 42 extends laterally across the second end 34 of the spool 20.

As shown in FIG. 2, the bar 42 is adapted to receive a movable pin 44 extending through the bore 14 from an actuator 46. The actuator 46 moves the pin 44 and the spool 20 linearly in the bore 14 in a second direction (downward in FIG. 2), to compress the spring 38 and move the second end 34 of the spool 20 to a position within the bore 14 where the ports 18 are at least partially open beyond the second end 34 of the spool 20, allowing fluid to flow through the ports 18 and axially through the spool 20, as shown by the arrow 48 in FIG. 2. As shown by the arrowheads on both ends of the arrow 48, fluid can flow in either direction through the valve 10, depending upon the relative fluid pressures at a first and a second fluid inlet/outlet 50, 52 of the valve 10.

The spool wall 22 and bar 42 at the second end 34 of the spool 20 define substantially sharp corners to minimize development of axially directed components of a boundary level of the fluid flowing through the second end 34 of the spool 20. The spool 20 configuration described above substantially reduces unwanted linear movement of the spool 20 in the bore 14 when fluid is flowing through the spool 20, thereby significantly improving stability of the valve 10 in maintaining control of the fluid flowing through the valve 10.

Preferably, the second end 34 of the spool 20 is flat and substantially perpendicular to the axis 24 of the spool 20, and the wall thickness 26 at the second end is in the range of 0.2 to 0.6 millimeters. In the embodiment of the spool 20 depicted in FIGS. 3a–3d, this is achieved by a step 54 in the inner cylindrical surface 28 of the wall 22 adjacent the second end 34 of the spool 20. The step 54 thins the wall thickness 26 to produce a thickness in the range of 0.2 to 0.6 millimeters. The step 54 has substantially sharp corners, and may extend axially into the spool 20 beyond the bar 42, as shown in FIG. 3c.

Figure 4B:
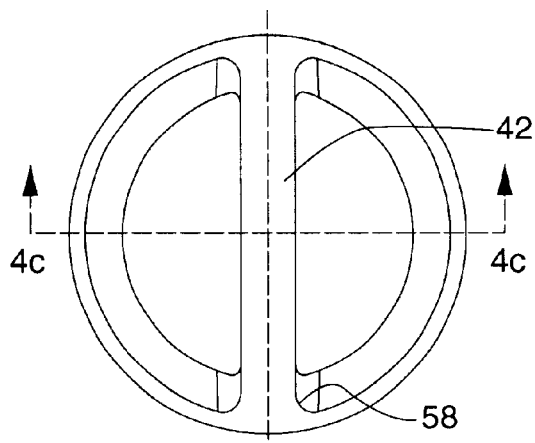
FIGS. 4a–d depict various external and cross sectional views of a second exemplary embodiment of a valve spool according to our invention.
Figure 4A:
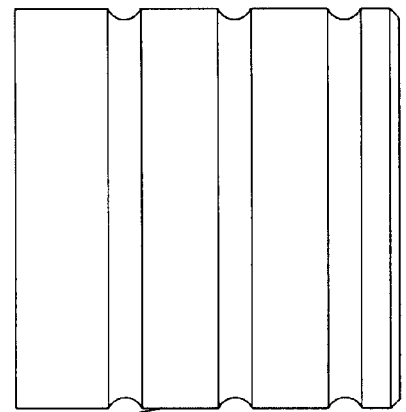
Figure 4C:
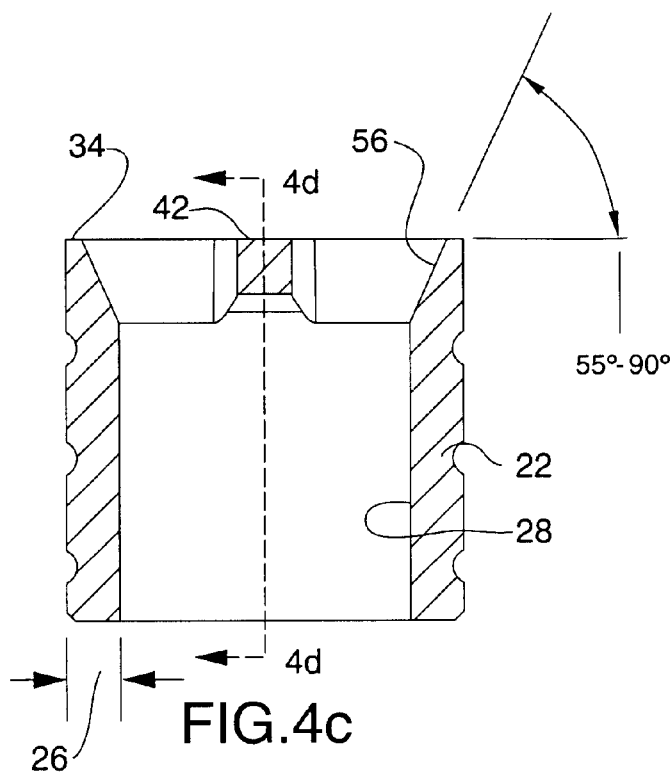
Figure 4D:
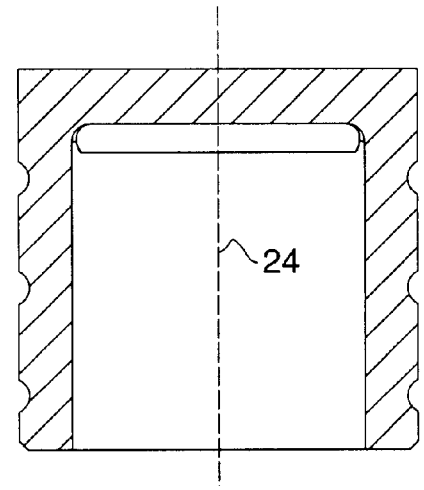

FIGS. 4a–4d depict a second embodiment of a spool 20 according to our invention, wherein the second end 34 of the spool 20 is flat and substantially perpendicular to the spool axis 24. The inner cylindrical surface 28 of the wall 22 at the second end 34 of the spool 20 defines a conical chamfer 56 that reduces the thickness 26 of the spool wall 22 at the second end 34 of the spool 20 to a thickness 26 in the range of 0.2 to 0.6 millimeters. The conical chamfer 56 forms an angle in the range of degrees, as shown in FIG. 4c with the second end 34 of the spool 20, and converges along the spool axis 24. The intersections of the conical chamfer 56 with the second end 34 and inner cylindrical surface 28 of the spool form substantially sharp corners, and may extend axially into the spool 20 beyond the bar 42, as shown in FIG. 4c.

In the spool embodiments depicted in FIGS. 3a–3d, and in FIGS. 4a–4d, the intersection of the bar with the spool wall may be radiused, as shown at 58, to define a radius in the range of 0.65 to 0.35 millimeters.

While the embodiments of our invention disclosed herein are presently considered to be preferred, various changes and modifications can be made without departing from the spirit and scope of the invention. The scope of the invention is indicated in the appended claims. We intend that all changes or modifications within the meaning and range of equivalents are embraced by the claims.

We claim:

1. A valve spool adapted for linear movement in a bore and for regulating fluid flow through fluid ports entering the bore through a sidewall of the bore, the valve spool comprising:

a generally tubular cylindrical body having an annular wall defining an axis of the spool, a wall thickness of the spool, and inner and outer cylindrical surfaces of the spool extending between a first and a second axial end of the spool;

the outer cylindrical surface defining a cylindrical land at the second axial end of the spool adapted to slidingly mate with the sidewall of the bore and having an axial land length sufficient to block flow through the fluid ports of the bore when the spool is positioned within the bore with the land covering the fluid ports;

the first end of the spool being adapted for receipt of spring means for urging the spool to move in a first linear direction within the bore to position the land to block the fluid ports; and the second end of the spool being generally open for the passage of fluid and having a bar extending laterally across the second end of the spool, the bar being adapted to receive a pin from an actuator extending through the bore for moving the spool linearly in the bore in a second direction to compress the spring means and move the second end of the spool to a position within the bore where the ports are at least partially open beyond the second end of the spool, with the spool wall and bar at the second end of the spool defining substantially sharp corners, whereby the spool configuration substantially reduces linear movement of the spool in the bore when fluid is flowing through the spool.

2. The valve spool of claim 1 wherein the second end of the spool is flat and perpendicular to the spool axis, and the wall thickness of the spool at the second end of the spool is in the range of 0.2 to 0.6 millimeters.

3. The valve spool of claim 1 wherein the intersection of the bar with the spool wall is radiused.

4. The valve spool of claim 3 wherein the radiused intersection of the bar with spool wall defines a radius in the range of 0.65 to 0.35 millimeters.

5. The valve spool of claim 1 wherein second end of the spool defines a plane extending perpendicularly to spool axis and the bar defines an outer flat surface thereof coincident with a flat plane defined by the second end of the spool.

6. The valve spool of claim 1 wherein the bar defines flat sidewalls thereof extending generally parallel to the spool axis.

7. The valve spool of claim 1 wherein the spool wall at the second end of the spool is thinned by a step in the inner cylindrical wall of the spool, the step having substantially sharp corners and resulting in the wall of the spool in the step having a thickness in the range of 0.2 to 0.6 millimeters.

8. The valve spool of claim 7 wherein the bar extends an axial distance from the second end into the spool, and the step extends beyond the bar.

9. The valve spool of claim 1 wherein the second end of the spool is flat and substantially perpendicular to the spool axis, and the inner cylindrical surface of the spool wall at the second end of the spool defines a conical chamfer reducing the thickness of the spool wall at the second end of the spool to a thickness in the range of 0.2 to 0.6 millimeters, the conical chamfer forming an angle in the range of 55 to 90 degrees with the second end of the spool and converging along the spool axis, the conical chamfer having substantially sharp corners.

10. The valve spool of claim 9 wherein the bar extends an axial distance from the second end into the spool, and the conical chamfer extends beyond the bar.

11. A control valve comprising:
a housing defining a bore having a sidewall and fluid ports extending through a sidewall of the bore; and
a valve spool adapted for linear movement in the bore and for regulating fluid flow through the fluid ports;
the valve spool including a generally tubular cylindrical body having an annular wall defining an axis of the spool, a wall thickness of the spool, and inner and outer cylindrical surfaces of the spool extending between a first and a second axial end of the spool;
the outer cylindrical surface of the valve spool defining a cylindrical land at the second axial end of the spool adapted to slidingly mate with the sidewall of the bore and having an axial land length sufficient to block flow through the fluid ports of the bore when the spool is positioned within the bore with the land covering the fluid ports;
the first end of the spool being adapted for receipt of spring means for urging the spool to move in a first linear direction within the bore to position the land to block the fluid ports; and
the second end of the spool being generally open for the passage of fluid and having a bar extending laterally across the second end of the spool, the bar being adapted to receive a pin from an actuator extending through the bore for moving the spool linearly in the bore in a second direction to compress the spring means and move the second end of the spool to a position within the bore where the ports are at least partially open beyond the second end of the spool, with the spool wall and bar at the second end of the spool defining substantially sharp corners, whereby the spool configuration substantially reduces linear movement of the spool in the bore when fluid is flowing through the spool.

12. The control valve of claim 11 wherein the second end of the spool is flat and perpendicular to the spool axis, and the wall thickness of the spool at the second end of the spool is in the range of 0.2 to 0.6 millimeters.

13. The control valve of claim 11 wherein the intersection of the bar with the spool wall is radiused.

14. The control valve of claim 13 wherein the radiused intersection of the bar with spool wall defines a radius in the range of 0.65 to 0.35 millimeters.

15. The control valve of claim 11 further comprising spring means for urging the spool to move in the first linear direction within the bore to position the land to block the fluid ports.

16. The control valve of claim 11 further comprising an actuator having a movable pin extending through the bore and bearing against the bar for moving the spool linearly in the bore in the second direction for compressing the spring and positioning the second end of the spool within the bore so that the ports are at least partially open beyond the second end of the spool.

17. The control valve of claim 11 wherein the spool wall at the second end of the spool is thinned by a step in the inner cylindrical wall of the spool, the step having substantially sharp corners and resulting in the wall of the spool in the step having a thickness in the range of 0.2 to 0.6 millimeters.

18. The control valve of claim 17 wherein the bar extends an axial distance from the second end into the spool, and the step extends beyond the bar.

19. The control valve of claim 11 wherein the second end of the spool is flat and substantially perpendicular to the spool axis, and the inner cylindrical surface of the spool wall at the second end of the spool defines a conical chamfer reducing the thickness of the spool wall at the second end of the spool to a thickness in the range of 0.2 to 0.6 millimeters, the conical chamfer forming an angle in the range of 55 to 90 degrees with the second end of the spool and converging along the spool axis, the conical chamfer having substantially sharp corners.

20. The control valve of claim 19 wherein the bar extends an axial distance from the second end into the spool, and the conical chamfer extends beyond the bar.

* * * * *